United States Patent Office 2,860,072
Patented Nov. 11, 1958

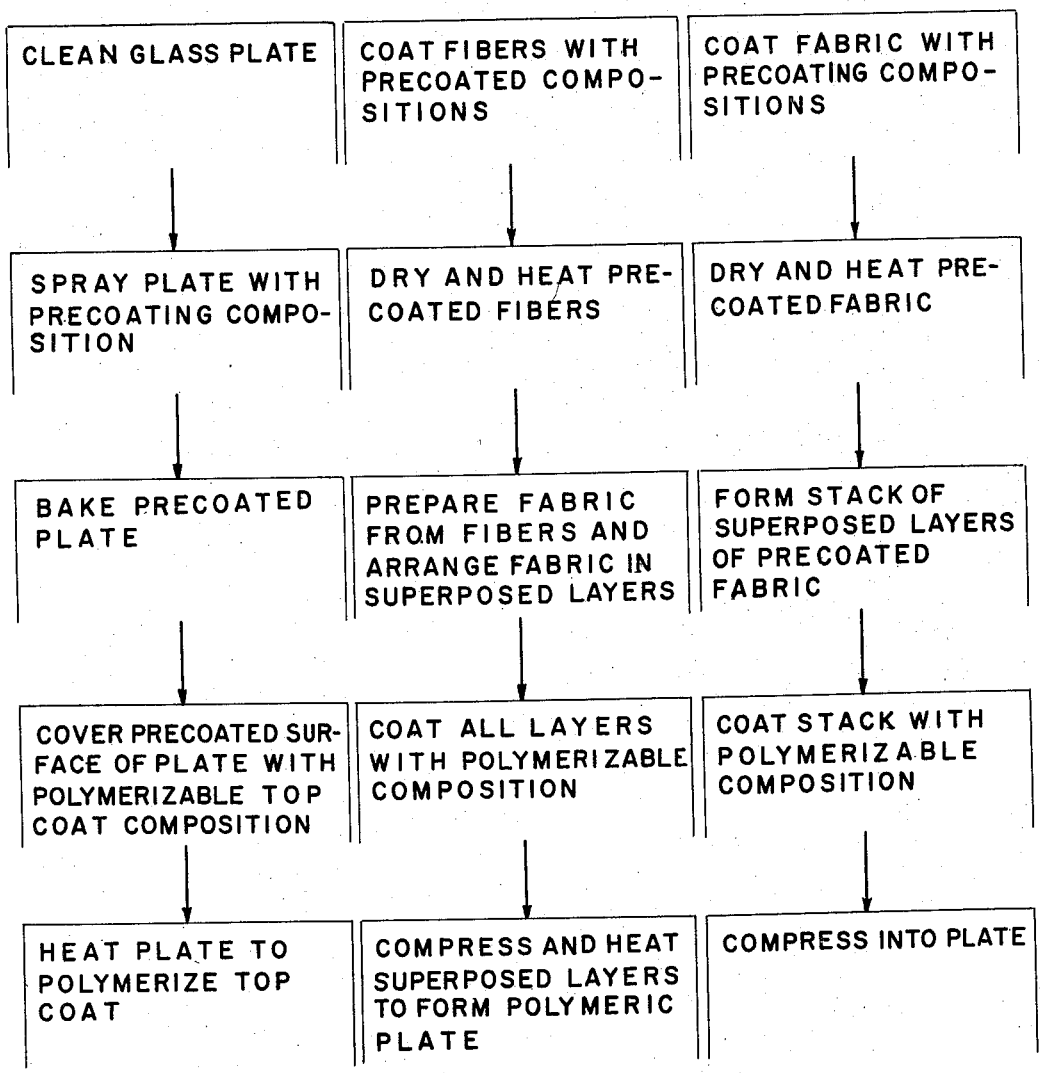

---

2,860,072

COATED SOLID MATERIALS AND METHOD FOR PRODUCING SAME

Günther Nischk and Eugen Bock, Leverkusen, Germany, assignors to Farbenfabriken Bayer Aktiengesellschaft, Leverkusen, Germany, a corporation of Germany Application May 14, 1954, Serial No. 429,980

Claims priority, application Germany May 19, 1953

7 Claims. (Cl. 117—72)

This invention relates to combinations of synthetic resins and solid materials, especially glass, and, more particularly, the invention concerns synthetic resins reinforced with glass fibers as in laminates and other reinforced plastics and as a coating or binder for glass fibers.

It is known that the mechanical properties of a number of synthetic resins prepared by polymerization or polycondensation are substantially improved by the incorporation therein of fibrous materials, especially glass fibers. These polymers with glass fibers incorporated, however, suffer from the considerable disadvantage that the bonding strength between the glass fiber and the polymerization or condensation product is usually low, so that in the course of time these products gradually decompose at the surface of contact with the glass fiber, and the glass becomes brittle. The mechanical properties are affected, especially when the synthetic resins are produced by the polymerization of unsaturated polyesters with vinyl or allyl compounds.

It is known to increase the strength of the bond between glass fibers and synthetic resins by pretreatment with various products, of which chromium complexes of acrylic and methacrylic acid have proved to be particularly useful. Adhesion between glass and synthetic resins containing basic groups, however, cannot be effected by the aforesaid compounds, or can be effected only to a minor degree.

An object of the invention is to produce combinations of synthetic resins and other solid materials, especially glass, in which the constituents are strongly bonded one to another.

Another object is to produce combinations of synthetic resins and other solid materials, especially glass, during the manufacturing process of said synthetic resins.

Further objects will become apparent as the following description proceeds.

In accordance with the invention it has surprisingly been found that the amine salts of unsaturated copolymerizable condensation or polymerization products containing carboxyl groups ensure an extraordinarily good bond between materials of all kinds, especially glass or glass-like materials, and the said synthetic resins, and are far more effective than previously known products.

Accordingly, the present invention provides a process of bonding a synthetic resin to other solid materials, especially glass or a glass-like synthetic resin, which comprises pretreating the solid materials with amine salts of unsaturated co-polymerizable condensation or polymerization products containing carboxyl groups, and producing the synthetic resin in contact with the surface of the material thus pretreated, for instance by condensation or polymerization.

The invention is illustrated in flow diagram form in Figures 1–3 of the drawing.

The amine salts employed according to the invention provide excellent adhesion between glass and synthetic resins containing basic groups which could not be satisfactorily bonded with products hitherto known for this purpose.

The amine salts used in the process of the invention possess the further advantage over the above-said previously known products that the bonding process need not necessarily be carried out in aqueous solution; aqueous solutions of the amine salts of co-polymerizable unsaturated condensation or polymerization products containing carboxyl groups are, however, stable for a substantially longer period before gradual decomposition of the solutions occurs, whereas the chromium complexes of the ammonium salts of acrylic and methacrylic acid, for instance, are stable only for some hours. Furthermore, the bonding effect between the solid material and the synthetic resin employed according to the invention is substantially independent of the concentration of the aqueous solution of these amine salts, whereas the chromium complexes of acrylic and methacrylic acid must be employed in concentrations within definite, very narrow limits in order to produce an adhesion between a synthetic resin and glass.

The amine salts of the unsaturated condensation or polymerization products containing carboxyl groups which are employed according to the invention can be obtained by conventional methods, for instance by condensation of a mixture of polyalcohol and polycarboxylic acids. In the condensation the reactants can be employed in such a quantitative proportion as to give a polycondensation product containing free carboxyl groups; alternatively a large excess of polyalcohol can be employed to give a condensation product with a very high content of hydroxyl groups, and to this product unsaturated or saturated dicarboxylic anhydrides are added in a second phase, whereupon ester interchange takes place with opening of the ring to leave one free carboxyl group. These co-polymerizable condensation or polymerization products containing carboxyl groups are reacted with an amount, for instance an equivalent amount, of a tertiary amine such as pyridine or N-methyl morpholine, preferably in aqueous solution. As a matter of fact, an excess or deficiency of the amine may be employed to form the amine salt without the bonding strength betweent the synthetic resin and glass being affected.

The fiber, especially glass fiber, is treated with a solution of one of the products obtained as described above and the solvent, which may be water or another solvent, is evaporated, leaving on the fiber a coating of a homogeneous stable film; this film shows good adhesion to a synthetic resin produced in contact with its surface, for instance by polymerization or condensation.

If the fiber thus pretreated with an amine salt is embedded in solutions of unsaturated polyesters in for instance vinyl or allyl compounds, and polymerization accelerators are added, co-polymers are obtained which have an extraordinarily strong bonding strength between the solid materials, for instance glass, and the polymer; these co-polymers no longer show the disadvantages associated with the previously used products, even after storage in water for a prolonged time. Glass plates which are not coated with the above-described product show no bonding capacity with the polymer after storage in water for a short time. If glass plates are treated according to the invention the synthetic resin layers can no longer be separated without the glass being cracked or the surface torn, even after storage in water for a prolonged time.

The new process thus offers the possibility of using, instead of previously employed preparations, products which have an extraordinarily good affinity for solid materials, especially glass, are stable under normal conditions of storage and, in combination with unsaturated polyesters and vinyl or allyl compounds, are capable of taking part in the co-polymerization reaction in the presence of compounds accelerating polymerization, thus providing a strong bond both to the solid material, for instance glass, and the polymer.

The invention is further illustrated by the following examples, without being restricted thereto, the parts being by weight.

Example 1

A 1% solution of an amine salt of an unsaturated polymerized product is sprayed on to a well purified and degreased glass plate. The amine salt is prepared as follows:

1440 parts of maleic acid dimethyl ester and 2120 parts of diglycol are heated with 5 parts of p-toluene sulfonic acid in a stream of nitrogen until 640 parts of methanol have distilled off. 100 parts of this ester are reacted with 56 parts of maleic anhydride at 120° C. This reaction is carried out with agitation and takes about one hour. 100 parts of the resulting addition product are heated to 80–100° C. and a solution of 32 parts of pyridine and 200 parts of water is added in several portions; after cooling a clear solution results.

After volatilization of the solvent, which takes place rapidly, the sprayed glass plate is exposed to a temperature of 150° C. Thereupon a 3 millimeter thick layer of a mixture of an unsaturated polyester (prepared from one mol of maleic acid, one mol of phthalic acid and two mols of 1,3-butylene glycol) and styrene, which contains 2% of benzoyl peroxide as catalyst, is applied to the plate. The layer of this mixture is covered with another non-pretreated, purified glass plate and polymerized at 90° C. for one hour. After completion of the polymerization the non-pretreated glass plate can be taken off easily, whereas the glass plate pretreated with the amine salt of the unsaturated polymerization product sticks to the polymerized polyester resin layer so firmly that the glass surface is considerably torn on trying to separate the two surfaces by force, even after storage in water for several days.

This process is illustrated in Figure 1 of the drawing.

Example 2

Glass monofils, after issuing from the nozzles of a multifilament spinning machine, are collected into a cable and passed over a binder cushion which is fed with a 2% aqueous solution of an amine salt of an unsaturated polymerization product which is prepared as follows:

288 parts of maleic acid dimethyl ester and 310 parts of diglycol are heated with 1 part of p-toluene sulfonic acid in a stream of nitrogen until 128 parts of methanol have distilled off. 478 parts of this ester are reacted with 196 parts of maleic anhydride at 120° C. so as to cause addition of the maleic anhydride. 30 parts of pyridine dissolved in 200 parts of water are added to 100 parts of the resultant addition product at 80–100° C., and a clear solution is formed.

After evaporating the water in an air current the filaments thus treated are heated to 150° C. and reeled. A fabric made from these filaments is arranged in 10 superposed layers, coated with a catalyzed mixture of the unsaturated polyester and styrene (as indicated in Example 1) and compressed in a 100° C. hot press at a pressure of 2 kg./cm.² for 2 minutes. Due to the pretreatment the filaments are thoroughly wetted with the polyester resin and a plate is obtained which is free of bubbles and has very good stability to influences of the weather.

This process is illustrated in Figure 2 of the drawing.

Example 3

A fabric consisting of glass monofils, which is interlaced with linen, is heated to 300° C. for one hour to decompose the fluxing and sizing agent. The fabric is then placed in a 2% aqueous solution of an amine salt of an unsaturated polymerization product prepared as described in Example 2. After squeezing out the solution, the fabric is dried and heated to 150° C. for 10 minutes. 20 layers of the fabric thus treated are superposed and coated with a mixture of an unsaturated polyester, prepared from 10,440 parts of maleic acid, 3285 parts of adipic acid, 9900 parts of phthalic anhydride, 11,400 parts of glycol and 690 parts of N-diphenyl-diethanolamine by thermal esterification, together with 30% of styrene and 2% of benzoyl peroxide as catalyst; the fabric is pressed at 25° C. for one hour. The plate, thus prepared by a cold process, is stored at 90° C. for one hour; it then exhibits excellent stability to the influences of water and atmospheric conditions.

This process is illustrated in Figure 3 of the drawing.

We claim:

1. A process of bonding a glass article to a synthetic resin which comprises (1) precoating the glass surface with a cyclic tertiary amine salt of an ethylenically unsaturated linear polyester containing free carboxyl groups, and (2) copolymerizing said precoating with an ethylenically unsaturated linear polyester and a vinyl monomer, whereby the aforesaid synthetic resin is formed in situ on the precoated glass surface.

2. Process of claim 1 wherein the polymerization step is conducted in the presence of a polymerization accelerator.

3. Process of claim 1, wherein said ethylenically unsaturated linear polyester containing a free carboxylic group is produced by esterifying an aliphatic ethylenically unsaturated dicarboxylic acid with a dihydric alcohol.

4. Process of claim 1 wherein said ethylenically unsaturated linear polyester containing free carboxyl groups is produced by reacting a linear polyester containing free hydroxyl groups with a dicarboxylic anhydride.

5. A process of forming a laminate of glass and a synthetic resin comprising spraying the surface of a glass plate with a solution of a cylic t-amine salt of a linear polyethylene maleate-maleic anhydride addition product containing free hydroxyl groups, heating the sprayed glass plate to bake the coating thereon, applying to the coating a layer of a reaction mixture of styrene and an unsaturated linear polyester of maleic acid, phthalic acid, and 1,3-butylene glycol, and then heating the glass plate to effect thermal polymerization of the final coating, whereby the pretreated glass plate is firmly adhered to the polymerized polyester top coat.

6. A process of forming a synthetic resin having glass fibers imbedded therein and firmly bonded thereto so as to reinforce said resin comprising (1) precoating said glass fibers with a cyclic tertiary amine salt of an ethyenically unsaturated linear polyester containing free carboxyl groups, and (2) immersing said precoated glass fibers in a polymerization mixture of an ethylenically unsaturated linear polyester and a vinyl monomer which is copolymerizable both with said polyester and with said precoating, and polymerizing said mixture to form a synthetic resin which is chemically bonded to the precoated surface of the glass fibers.

7. A process of preparing a synthetic resin plate having glass fibers embedded therein and firmly bonded thereto so as to reinforce said plate comprising precoating said glass fibers with a pyridine salt of a linear polyethylene maleate-maleic anhydride addition product containing a free carboxyl group, heating the coated filaments so as to bake said amine salt to the surface of the fibers, arranging the resulting glass fibers in the form of superposed layers, coating the resulting layers with a catalyzed mixture of styrene and an unsaturated linear polyester selected from the group consisting of (1) an unsaturated polyester of maleic acid, phthalic acid and 1,3-butylene glycol and (2) an unsaturated polyester of maleic acid, adipic acid, phthalic anhydride, glycol and N-diphenyl-diethanol amine, compressing the layers of glass fabric and polymerizing said mixture of styrene and unsaturated polyester so as to form a plate having a resin matrix reinforced with firmly adhered glass fibers.

References Cited in the file of this patent

UNITED STATES PATENTS

| | | |
|---|---|---|
| 2,194,646 | De Groote | Mar. 26, 1940 |
| 2,373,527 | Agens | Apr. 10, 1945 |
| 2,461,918 | Petke | Feb. 15, 1949 |
| 2,477,791 | Foster et al. | Aug. 2, 1949 |
| 2,480,928 | Hurdis | Sept. 6, 1949 |
| 2,563,289 | Steinman | Aug. 7, 1951 |
| 2,602,037 | Nelb | July 1, 1952 |
| 2,646,416 | Parker | July 21, 1953 |

FOREIGN PATENTS

| | | |
|---|---|---|
| 572,671 | Great Britain | Oct. 18, 1945 |